UNITED STATES PATENT OFFICE.

JESSE PETERSON, OF LOCKPORT, NEW YORK, ASSIGNOR TO THE UNITED INDURATED FIBRE COMPANY, OF SAME PLACE.

BAKING-VARNISH.

SPECIFICATION forming part of Letters Patent No. 604,785, dated May 31, 1898.

Application filed February 17, 1897. Serial No. 623,785. (No specimens.)

*To all whom it may concern:*

Be it known that I, JESSE PETERSON, of Lockport, county of Niagara, and State of New York, have invented an Improvement in Compositions of Matter, of which the following description is a specification.

The present invention relates to a composition of matter adapted to be used as a baking-varnish or enamel—that is to say, a varnish to be applied in liquid form and then subjected to heat or baked until it is thoroughly hardened or set. This varnish is especially useful in connection with indurated fiberware or other material which it is desired to render waterproof, as it is not only insoluble in water, but also capable of withstanding a high degree of heat, as is necessary in pails and other receptacles made from fiberware which are adapted to contain boiling water or other liquids heated to a high degree.

The varnish which forms the subject of this invention consists of maize-oil or "corn-oil," as it is sometimes called, and resin or other gums, there being substantially equal quantities of each, to which may be added about ten per cent. of "drier." In preparing the varnish the corn-oil is boiled until it reaches the proper consistency, it being found best to boil it for about three days, the resin being added thereto and the drier, which may be any of the so-called "driers" in commercial use for mixing with paint or varnish, is also added after the boiling process is completed. After the composition is made as above described it may be applied in any suitable or usual way, as by painting or dipping, after which the article to which it is applied is preferably subjected to heat until the varnish is thoroughly hardened, the result being that a substantially waterproof finish is obtained, the appearance of which, moreover, is superior to that of other varnishes commonly employed.

The varnish embodying the invention, as has been stated, is particularly applicable to articles which are capable of being subjected to a high degree of heat, as in an ordinary enameling-oven, it being found, however, that the same composition will dry and harden in the air if time enough is given and the air sufficiently heated to substantially reduce the humidity, it being practicable, for example, to use this varnish for floors or other inside finish if the room in which the varnish is applied can be left for several days and heated to somewhat above the usual normal temperature.

I claim—

1. The herein-described baking-varnish or enamel which consists of boiled corn-oil as its essential ingredient, and a resin or gum mixed therewith, substantially as described.

2. The herein-described baking-varnish or enamel which consists of corn-oil, resin or gum, and a drier, said materials being used in substantially the proportions stated, substantially as described.

In testimony whereof I have signed my name to this specification in the presence of two subscribing witnesses.

JESSE PETERSON.

Witnesses:
F. P. ARMSTRONG,
CHAS. E. FOLGER.